US009384708B2

(12) United States Patent
Liu et al.

(10) Patent No.: US 9,384,708 B2
(45) Date of Patent: Jul. 5, 2016

(54) DISPLAY SCREEN MANAGEMENT METHOD AND DEVICE

(75) Inventors: Fengpeng Liu, Shenzhen (CN); Haibo She, Shenzhen (CN); Dongmei Liu, Shenzhen (CN); Lingling Dong, Shenzhen (CN); Qinli Sun, Shenzhen (CN); Zongwei Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 53 days.

(21) Appl. No.: 14/003,914

(22) PCT Filed: Nov. 4, 2011

(86) PCT No.: PCT/CN2011/081812
§ 371 (c)(1),
(2), (4) Date: Sep. 9, 2013

(87) PCT Pub. No.: WO2012/151882
PCT Pub. Date: Nov. 15, 2012

(65) Prior Publication Data

US 2014/0146070 A1 May 29, 2014

(30) Foreign Application Priority Data

Aug. 3, 2011 (CN) .......................... 2011 1 0221236

(51) Int. Cl.
*G09G 5/02* (2006.01)
*G09G 5/00* (2006.01)
(Continued)

(52) U.S. Cl.
CPC .................. *G09G 5/003* (2013.01); *G09G 3/20* (2013.01); *G09G 5/02* (2013.01); *G09G 5/10* (2013.01);

(Continued)

(58) Field of Classification Search
None
See application file for complete search history.

(56) References Cited

U.S. PATENT DOCUMENTS

| | | | |
|---|---|---|---|
| 4,550,221 | A | 10/1985 | Mabusth |
| 2005/0156949 | A1 | 7/2005 | Tsou |

(Continued)

FOREIGN PATENT DOCUMENTS

| | | | |
|---|---|---|---|
| CN | 1959802 | A | 5/2007 |
| CN | 101346755 | A | 1/2009 |

(Continued)

OTHER PUBLICATIONS

International Search Report for PCT/CN2011/081812 dated Apr. 6, 2012.

*Primary Examiner* — Ryan D McCulley
(74) *Attorney, Agent, or Firm* — Ling Wu; Stephen Yang; Ling and Yang Intellectual Property

(57) ABSTRACT

The present document provides a method and apparatus for managing a display screen, and the display screen includes at least two display areas. The method includes: detecting a first display effect damaged value of a first display area in the at least two display areas; comparing the first display effect damaged value with a predetermined threshold value, and outputting a first comparison result; and when the first display effect damaged value is larger than the threshold value, adjusting a display effect of the first display area to a first display effect based on the first display effect damaged value, to match the first display effect with a second display effect of a second display area without stains. Through the above technical scheme, adjustment is performed on display effect of the display screen, which guarantees the display effect of the display screen and makes the user experience of users enhance greatly.

9 Claims, 3 Drawing Sheets

(51) Int. Cl.
*G09G 5/10* (2006.01)
*G09G 3/20* (2006.01)

(52) U.S. Cl.
CPC ...... *G09G 2320/04* (2013.01); *G09G 2320/046* (2013.01); *G09G 2320/06* (2013.01); *G09G 2320/066* (2013.01); *G09G 2320/0626* (2013.01); *G09G 2320/0686* (2013.01)

(56) References Cited

U.S. PATENT DOCUMENTS

| | | | | |
|---|---|---|---|---|
| 2006/0109391 | A1* | 5/2006 | Huitema et al. | 349/19 |
| 2008/0049051 | A1* | 2/2008 | Han | G09G 3/006 345/690 |
| 2008/0088648 | A1* | 4/2008 | Nathan et al. | 345/690 |
| 2010/0103198 | A1 | 4/2010 | Polak et al. | |
| 2010/0188324 | A1* | 7/2010 | Ohashi | G02F 1/133603 345/102 |
| 2011/0242074 | A1* | 10/2011 | Bert et al. | 345/207 |

FOREIGN PATENT DOCUMENTS

| | | | |
|---|---|---|---|
| CN | 101777312 | A | 7/2010 |
| JP | 2002222407 | A | 8/2002 |
| JP | 2003167550 | A | 6/2003 |
| JP | 2006035254 | A | 2/2006 |
| JP | 2007286170 | A | 11/2007 |
| JP | 2010026406 | A | 2/2010 |
| JP | 2010160509 | A | 7/2010 |
| JP | 2010197631 | A | 9/2010 |
| JP | 2011118361 | A | 6/2011 |

* cited by examiner

| Capacitance value | Display effect damaged degree level |
| --- | --- |
| 10 | 10 |
| 9 | 9 |
| 8 | 8 |
| 7 | 7 |
| 6 | 6 |
| 5 | 5 |
| 4 | 4 |
| 3 | 3 |
| 2 | 2 |
| 1 | 1 |
| 0 | 0 |

| Display effect damaged value | Contrast level |
|---|---|
| 0 | 10 |
| 1 | 9 |
| 2 | 8 |
| 3 | 7 |
| 4 | 6 |
| 5 | 5 |
| 6 | 4 |
| 7 | 3 |
| 8 | 2 |
| 9 | 1 |
| 10 | 0 |

FIG. 5

| Display effect damaged value | Brightness level |
|---|---|
| 0 | 10 |
| 1 | 9 |
| 2 | 8 |
| 3 | 7 |
| 4 | 6 |
| 5 | 5 |
| 6 | 4 |
| 7 | 3 |
| 8 | 2 |
| 9 | 1 |
| 10 | 0 |

FIG. 6

DISPLAY SCREEN MANAGEMENT METHOD AND DEVICE

TECHNICAL FIELD

The present document relates to the display technology in the electronic technology, and particularly, to a method and apparatus for managing a display screen.

BACKGROUND OF THE RELATED ART

With the continuous development of the computer technology, the communication technology and the Internet technology, there are more and more categories of electronic devices which can be used by users, such as a desk computer, a notebook computer, a mobile phone and an MP4, and so on. Almost all the electronic devices have display screens, and the user will touch the display screens of the electronic devices more or less during using these electronic devices; for example, during using the notebook computer, the user will touch the display screen of the notebook computer with hands when sharing contents in the computer with others; and particularly in the process of using a tablet computer or the mobile phone with a touch screen, the user touches the touch screen more frequently.

In the related art, whether there is a display screen with a touching function or without a touching function, surface materials of the display screens will be contaminated in varying degrees in the process of the user touching the display screens with hands; for example, when there are stains or sweat stains on fingers, the stains or fingerprints will be left on the display screen during touching.

After the display screen is contaminated in varying degrees, it will have negative influences on display effects, such as dimming of display brightness of contaminated areas and reduction of display contrast of contaminated areas, and so on; moreover, it even makes the user cannot distinguish the displayed contents clearly at the time of the worse contamination.

SUMMARY OF THE INVENTION

In view of this, the present document provides a method and apparatus for managing a display screen, which is used to solve the technical problem of display effect reduction after the display screen is contaminated in varying degrees existing in the related art.

The present document provides the following technical scheme through an embodiment in the present document.

A method for managing a display screen, in which the display screen comprises at least two display areas, comprises:

detecting a first display effect damaged value of a first display area in the at least two display areas;

comparing the first display effect damaged value with a predetermined threshold value, and outputting a first comparison result; and when the first display effect damaged value is larger than the threshold value, adjusting a display effect of the first display area to a first display effect based on the first display effect damaged value, to match the first display effect with a second display effect of a second display area without stains.

Alternatively, the step of detecting a first display effect damaged value of a first display area in the at least two display areas comprises:

detecting a first capacitance value of the first display area; and based on the first capacitance value, determining the first display effect damaged value corresponding to the first capacitance value using a comparison relationship table between capacitance values and display effect damaged values.

Alternatively, the threshold value is determined through following steps:

collecting at least one parameter value used for determining the threshold value; and determining the threshold value based on the at least one parameter value.

Alternatively, the step of detecting a first display effect damaged value of a first display area in the at least two display areas comprises:

when a device in which the display screen is located is powered on, detecting the first display effect damaged value of the first display area in the at least two display areas; or when a device in which the display screen is located converts from an operating state with low power consumption to an operating state with high power consumption, detecting the first display effect damaged value of the first display area in the at least two display areas; or in the process of a device in which the display screen is located being in an operating state, detecting the first display effect damaged value of the first display area in the at least two display areas at regular time periods.

Alternatively, the display effect is contrast, and the step of adjusting a display effect of the first display area to a first display effect based on the first display effect damaged value to match the first display effect with a second display effect of a second display area without stains comprises:

adjusting a contrast of the first display area to a first contrast using a comparison relationship table between display effect damaged values and contrasts, to match the first contrast with a second contrast of the second display area without stains.

Alternatively, the display effect is brightness, and the step of adjusting a display effect of the first display area to a first display effect based on the first display effect damaged value to match the first display effect with a second display effect of a second display area without stains comprises:

adjusting a brightness of the first display area to a first brightness using a comparison relationship table between display effect damaged values and brightnesses, to match the first brightness with a second brightness of the second display area without stains.

The present document further provides the following technical scheme through an embodiment in the present document.

An apparatus for managing a display screen, in which the display screen comprises at least two display areas, comprises:

a detection module, configured to detect a first display effect damaged value of a first display area in the at least two display areas;

a comparison module, configured to compare the first display effect damaged value with a predetermined threshold value, and output a first comparison result; and an adjustment module, configured to, when the first display effect damaged value is larger than the threshold value, adjust a display effect of the first display area to a first display effect based on the first display effect damaged value, wherein the first display effect matches with a second display effect of a second display area without stains.

Alternatively, the detection module comprises:

a capacitance detection module, configured to detect a first capacitance value of the first display area; and a display effect damaged value determination module, configured to, based on the first capacitance value, determine the first display effect damaged value corresponding to the first capacitance value using a comparison relationship table between capacitance values and display effect damaged values.

Alternatively, the apparatus further comprises:

a collection module, configured to collect at least one parameter value used for determining the threshold value; and a threshold value determination module, configured to determine the threshold value based on the at least one parameter value.

Alternatively, the detection module is configured to detect the first display effect damaged value of the first display area in the at least two display areas when following conditions are met, and the conditions are:

a device in which the display screen is located being powered on; or a device in which the display screen is located converting from an operating state low power consumption to an operating state with high power consumption; or in the process of a device in which the display screen is located being in an operating state, and an expiration of a regular time period.

Alternatively, the display effect is contrast, and the adjustment module is configured to adjust the display effect of the first display area to the first display effect based on the first display effect damaged value to match the first display effect with the second display effect of the second display area without stains in the following way:

the adjustment module using a comparison relationship table between display effect damaged values and contrasts, adjusting a contrast of the first display area to a first contrast, wherein the first contrast matches with a second contrast of the second display area without stains.

Alternatively, the display effect is brightness, and the adjustment module is configured to adjust the display effect of the first display area to the first display effect based on the first display effect damaged value to match the first display effect with the second display effect of the second display area without stains in the following way:

the adjustment module using a comparison relationship table between display effect damaged values and brightnesses, adjusting a brightness of the first display area to a first brightness, wherein the first brightness matches with a second brightness of the second display area without stains.

On the other hand, the present document provides the following technical scheme through another embodiment in the present document.

A display screen comprises:

a display unit, configured to display display data transmitted to the display screen, wherein the display unit comprises at least two display areas; and a management apparatus, connected with the display unit; wherein, the management apparatus comprises:

a detection module, configured to detect a first display effect damaged value of a first display area in the at least two display areas;

a comparison module, configured to compare the first display effect damaged value with a predetermined threshold value, and output a first comparison result; and an adjustment module, configured to, when the first display effect damaged value is larger than the threshold value, adjust a display effect of the first display area to a first display effect based on the first display effect damaged value, wherein the first display effect matches with a second display effect of a second display area without stains.

One or more technical schemes in the above technical schemes have the following technical effects or advantages.

1. By detecting the display effect damaged value of the display screen and using the display effect damaged value to decide whether it is required to perform adjustment on display effect of the display screen, adjustment is performed on the display effect of the display screen when it is required to perform adjustment, thereby guaranteeing the display effect of the display screen and making the user experience of users enhance greatly.

2. When the display effect damaged value of the display screen is detected, the detection will be performed according to user's requirements, for example, the detection is performed when a device in which the display screen is located is powered on, thereby enabling the user to control the detecting opportunity.

3. With respect to the adjustment on the display effect of the display screen, the contrast can be adjusted alone, the brightness also can be adjusted alone, and the contrast and brightness can be also adjusted simultaneously, it can be fully guaranteed that the display effect after the adjustment can meet the requirements of users.

BRIEF DESCRIPTION OF DRAWINGS

FIG. 5 is a schematic diagram of a comparison relationship table between display effect damaged values and contrasts in embodiment one, two or three of the present document.

FIG. 6 is a schematic diagram of a comparison relationship table between display effect damaged values and brightnesses in embodiment one, two or three of the present document.

PREFERRED EMBODIMENTS OF THE PRESENT INVENTION

Figure 1:
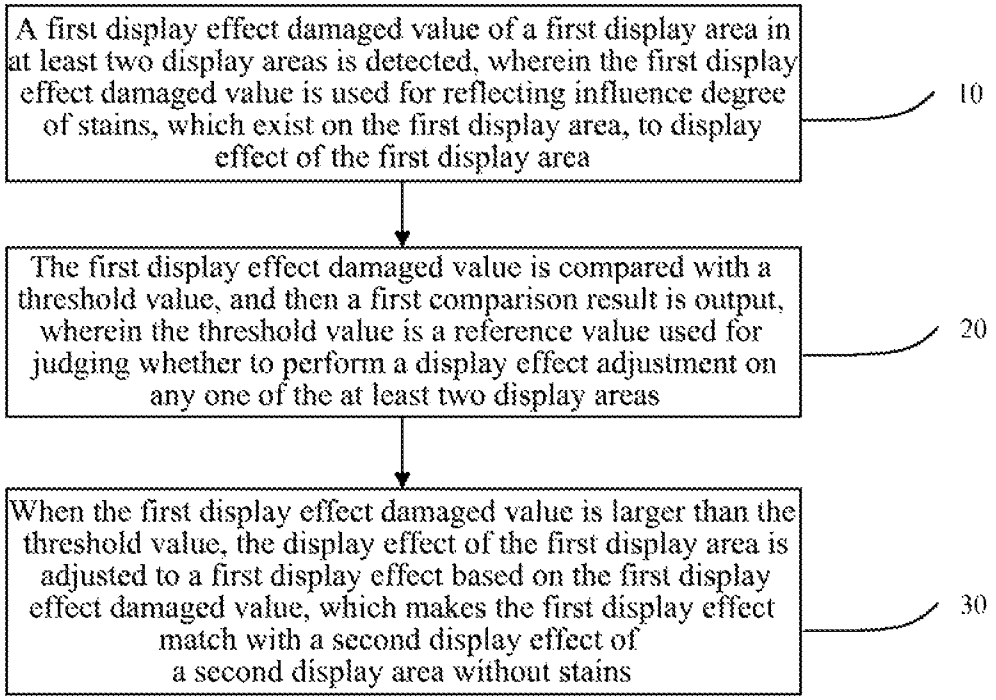
FIG. 1 is a flow chart of a method for managing a display screen in embodiment one of the present document.
Figure 2:
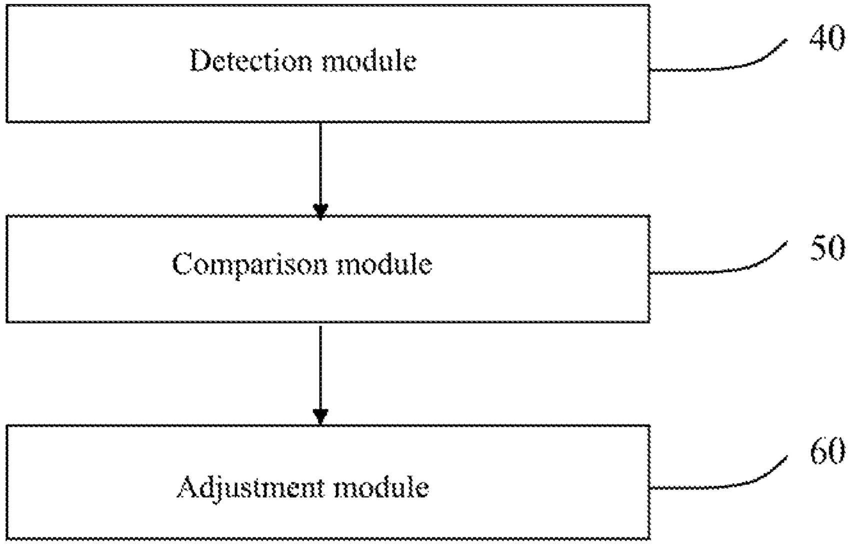
FIG. 2 is a block diagram of an apparatus for managing a display screen in embodiment two of the present document.

The basic idea of the present document is: detecting a first display effect damaged value of a first display area in at least two display areas; comparing the first display effect damaged value with a predetermined threshold value, and outputting a first comparison result; and, when the first display effect damaged value is larger than the threshold value, adjusting a display effect of the first display area to a first display effect based on the first display effect damaged value, thereby matching the first display effect with a second display effect of a second display area without stains.

In order to make those skilled in the art to which the present document belongs understand the present document more clearly, the technical scheme of the present document will be described in detail through specific embodiments and in combination with the accompanying drawings below.

In the embodiments of the present document, a display screen can be divided into a plurality of display areas, such as 10 display areas, 100 display areas or 1000 display areas. Generally speaking, the more the display areas are divided, the higher accuracy is and the better effects are when the display effects of the display screen are adjusted.

With reference to FIG. 1, FIG. 4, FIG. 5 and FIG. 6, a method for managing a display screen in embodiment one of the present document includes the following steps.

In step 10, a first display effect damaged value of a first display area in at least two display areas is detected. The first display effect damaged value is used for reflecting influence degree of stains, which exist on the first display area, to display effect of the first display area.

In a specific implementation process, when the display screen is a touch screen, the detecting the first display effect damaged value of the first display area in the at least two display areas specifically includes: detecting a first capacitance value of the first display area, and, based on the first capacitance value, determining the first display effect damaged value corresponding to the first capacitance value using a comparison relationship table between capacitance values and display effect damaged values.

The detecting the first capacitance value of the first display area can be performed when a device in which the touch screen is located is powered on, for example, with regard to a mobile phone with the touch screen, the detection is performed when the mobile phone is started up; it also can be performed when the device in which the touch screen is located converts from an operating state with low power consumption to an operating state with high power consumption, for example, with regard to a tablet computer with the touch screen, the detection is performed when the tablet computer converts from a sleep state to a normal operating state; and it further can be performed at regular intervals in the process of the device in which the touch screen is located being in an operating state, for example, with regard to the mobile phone with the touch screen, the detection is performed once every other 60 seconds or 2 minutes in the process of the device being in the operating state.

In an example of the present document, the touch screen includes 2 display areas, which are respectively a first display area and a second display area. In the method of the example of the present document, a first capacitance value of the first display area and a second capacitance value of the second display area are detected respectively to obtain the first capacitance value of 6 and the second capacitance value of 0.

Figures 3, 4:
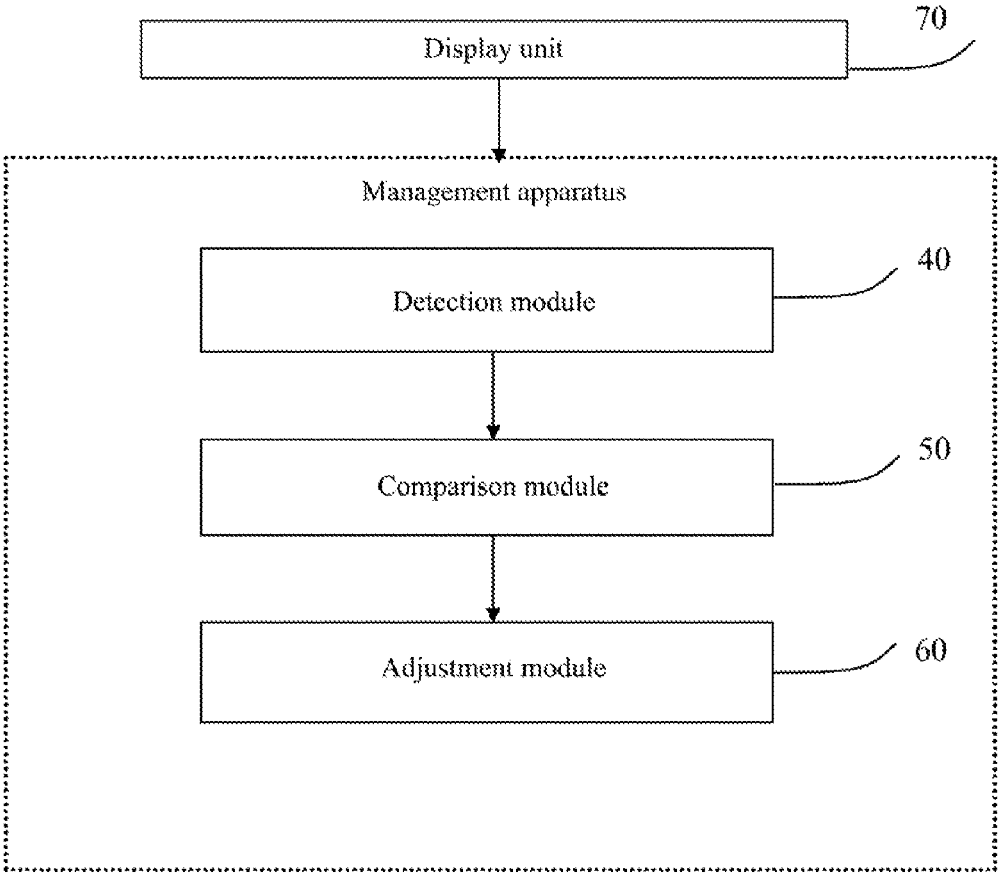
FIG. 3 is a block diagram of a display screen in embodiment three of the present document.
FIG. 4 is a schematic diagram of a comparison relationship table between capacitance values and display effect damaged values in embodiment one, two or three of the present document.

With regard to the first capacitance value, 6 represents that the first display area corresponding to the first capacitance value is contaminated, through a comparison relationship between capacitance values and display effect damaged values in FIG. 4, it can be known that a damaged degree corresponding to the first capacitance value of 6 is a 6-level, that is, a first display effect damaged value of the first display area is 6.

With regard to the second capacitance value, 0 represents that the second display area corresponding to the second capacitance value is not contaminated, through the comparison relationship between capacitance values and display effect damaged values in FIG. 4, it can be known that a damaged degree corresponding to the second capacitance value of 0 is a 0-level, that is, a second display effect damaged value of the second display area is 0.

In step 20, the first display effect damaged value is compared with a threshold value, and then a first comparison result is output, wherein the threshold value is a reference value used for judging whether to perform a display effect adjustment on any one of the at least two display areas.

In a specific implementation process, the threshold value is not fixed, a user can perform setting on the threshold value according to actual requirements, and the threshold value also can be performed setting in the process of producing the touch screen. When the threshold value is set, it is divided into two steps: collecting at least one parameter value used for determining the threshold value; and determining the threshold value based on the at least one parameter value. The parameter can be: (1) parameter corresponding to lens materials of the touch screen; or (2) parameter corresponding to performance of touch drive circuits or chips selected and used by the touch screen; or (3) parameter corresponding to an empirical value of actual fingerprint stains.

In this example, the threshold value is set as 2; the threshold value is higher, it is indicated that the contaminated degree of the touch screen is higher, and thus the display effect is adjusted. Certainly, in the practical using process, the skilled in the art also can set the threshold value as 1 or 5. Apparently, the display effect damaged value of the first display area is 6 and is larger than the threshold value of 2, which indicates that the display effect of the first display area is required to be adjusted; the display effect damaged value of the second display area is 0 and is less than the threshold value of 2, which indicates that the display effect of the second display area is well and is not required to be adjusted.

In step 30, when the first display effect damaged value is larger than the threshold value, the display effect of the first display area is adjusted to a first display effect based on the first display effect damaged value, which makes the first display effect match with a second display effect of the second display area without stains. The display effect can be contrast and also can be brightness. The user also can adjust other display effects such as saturation, grayscale, and so on, according to specific requirements. The specific process of adjusting the contrast and brightness will be described in detail below.

With reference to FIG. 5, the display effect is the contrast. Specifically, the first display effect damaged value of 6 is larger than the threshold value of 2, thus it is indicated that adjustment is required to be performed on the contrast of the first display area, then the first display effect damaged value of 6 is brought into a comparison relationship between display effect damaged values and contrasts, and it is discovered that, in order to adjust the display effect of the first display area to be identical with the display effect of the second display area, it is required to raise the contrast of the first display area from the current 4-level contrast by 6 levels to reach 10-level contrast.

With reference to FIG. 6, the display effect is the brightness. Specifically, the first display effect damaged value of 6 is larger than the threshold value of 2, thus it is indicated that adjustment is required to be performed on the brightness of the first display area, then the first display effect damaged value of 6 is brought into a comparison relationship between display effect damaged values and brightnesses, and it is discovered that, in order to adjust the display effect of the first display area to be identical with the display effect of the second display area, it is required to raise the brightness of the first display area from the current 4-level brightness by 6 levels to reach 10-level brightness.

With reference to FIG. 2, FIG. 4, FIG. 5 and FIG. 6, an apparatus for managing a display screen in the embodiment 2 of the present document includes the following modules.

A detection module 40 is configured to detect a first display effect damaged value of a first display area in the at least two display areas. The first display effect damaged value is used for reflecting influence degree of stains, which exist on the first display area, to a display effect of the first display area.

In a specific implementation process, when the display screen is a touch screen, the detection module specifically includes: a capacitance value detection module, configured to detect a first capacitance value of the first display area; and a display effect damaged value determination module, configured to: based on the first capacitance value, determine the first display effect damaged value corresponding to the first capacitance value using a comparison relationship table between capacitance values and display effect damaged values.

The capacitance value detection module can perform detection when a device in which the touch screen is located is powered on, for example, with regard to a mobile phone with the touch screen, the detection is performed when the mobile phone is started up; it also can perform detection when the device in which the touch screen is located converts from an operating state with low power consumption to an operating state with high power consumption, for example, with regard to a tablet computer with the touch screen, the detection is performed when the tablet computer converts from a sleep state to a normal operating state; and it also can perform detection at regular intervals in the process of the device in which the touch screen is located being in an operating state, for example, with regard to the mobile phone with the touch screen, the detection is performed once every other 60 seconds or 2 minutes in the process of being in the operating state.

In an example of the present document, the touch screen includes 2 display areas, which are respectively a first display area and a second display area. In the method of the example of the present document, a first capacitance value of the first display area and a second capacitance value of the second display area are detected respectively to obtain the first capacitance value of 6 and the second capacitance value of 0.

With regard to the first capacitance value, 6 represents that the first display area corresponding to the first capacitance value is contaminated. Through a comparison relationship between capacitance values and display effect damaged values in FIG. 4, it can be known that a damaged degree corresponding to the first capacitance value of 6 is a 6-level, that is, a first display effect damaged value of the first display area is 6.

With regard to the second capacitance value, 0 represents that the second display area corresponding to the second capacitance value is not contaminated. Through a comparison relationship between capacitance values and display effect damaged values in FIG. 4, it can be known that a damaged degree corresponding to the second capacitance value of 0 is a 0-level, that is, a second display effect damaged value of the second display area is 0.

The apparatus also includes: a comparison module 50, which is configured to compare the first display effect damaged value with a threshold value and output a first comparison result; wherein, the threshold value is a reference value used for judging whether to perform a display effect adjustment on any one display area of the at least two display areas.

In a specific implementation process, the threshold value is not fixed, a user can perform setting according to actual requirements, and the threshold value also can be performed setting in the process of producing the touch screen. When the threshold value is set, it is divided into two steps: collecting at least one parameter value used for determining the threshold value; and determining the threshold value based on the at least one parameter value. The parameter can be: (1) parameter corresponding to lens materials of the touch screen; or (2) parameter corresponding to performance of touch drive circuits or chips selected and used by the touch screen; or (3) parameter corresponding to an empirical value of actual fingerprint stains obtained by collecting samples of the fingerprint stains on a large scale.

In this example, the threshold value is set as 2, the threshold value is larger, it is indicated that a contaminated degree of the touch screen is higher, and thus the display effects is adjusted. Certainly, in the practical using process, the skilled in the art also can set the threshold value as 1 or 5. Apparently, the display effect damaged value of the first display area is 6 and is larger than the threshold value 2, which indicates that the display effect of the first display area is required to be adjusted; the display effect damaged value of the second display area is 0 and is less than the threshold value 2, which indicates that the display effect of the second display area is well and is not required to be adjusted.

The apparatus also includes an adjustment module 60, which is configured to: when the first display effect damaged value is larger than the threshold value, adjust the display effect of the first display area to a first display effect based on the first display effect damaged value, to make the first display effect match with a second display effect of the second display area without stains. The display effect can be contrast and also can be brightness. The user also can adjust other display effects such as saturation, grayscale, and so on, according to specific requirements. The specific process of adjusting the contrast and brightness will be described in detail below.

With reference to FIG. 5, the display effect is the contrast. Specifically, the first display effect damaged value of 6 is larger than the threshold value of 2, thus it is indicated that adjustment is required to be performed on the contrast of the first display area; at this time, the adjustment module brings the first display effect damaged value of 6 into a comparison relationship between display effect damaged values and contrasts, and raises the contrast of the first display area from the current 4-level contrast by 6 levels to reach 10-level contrast, so as to adjust the display effect of the first display area to be identical with the display effect of the second display area.

With reference to FIG. 6, the display effect is the brightness. Specifically, the first display effect damaged value of 6 is larger than the threshold value of 2, thus it is indicated that adjustment is required to be performed on the brightness of the first display area; at this time, the adjustment module brings the first display effect damaged value of 6 into a comparison relationship between display effect damaged values and brightnesses, and raises the brightness of the first display area from the current 4-level brightness by 6 levels to reach 10-level brightness, so as to adjust the display effect of the first display area to be identical with the display effect of the second display area.

With reference to FIG. 3, FIG. 4, FIG. 5 and FIG. 6, a display screen in the embodiment three of the present document includes:

a display unit 70, configured to display display data transmitted to the display screen, wherein the display unit includes at least two display areas; and a management apparatus, connected with the display unit, wherein, the management apparatus includes:

a detection module 40, configured to detect a first display effect damaged value of a first display area in the at least two display areas; wherein, the first display effect damaged value is used for reflecting influence degree of stains, which exist on the first display area, to a display effect of the first display area;

a comparison module 50, configured to compare the first display effect damaged value and a threshold value and output a first comparison result, wherein, the threshold value is a reference value used for judging whether to perform display effect adjustment on any one display area of the at least two display areas; and an adjustment module 60, configured to, when the first display effect damaged value is larger than the threshold value, adjust the display effect of the first display area to a first display effect based on the first display effect damaged value, to make the first display effect match with a second display effect of a second display area without stains.

In a specific implementation process, when the display unit is a touch screen, the entire implementation process of the management apparatus is the same as that of the apparatus for managing the display screen in the above embodiment two; the skilled in the art to which the present document belongs can understand the display screen in the embodiment three clearly and completely based on the technical scheme in the above embodiment two, and can perform implementation in the premise of not contributing creative work. Therefore, the management apparatus in the embodiment three will not be described in details here.

Through one or more examples in the embodiment 1, 2 or 3, the following technical effects can be implemented.

1. By detecting the display effect damaged value of the display screen and using the display effect damaged value to decide whether it is required to perform adjustment on display effect of the display screen, adjustment is performed on the display effect of the display screen when it is required to perform adjustment, thereby guaranteeing the display effect of the display screen and making the user experience of users enhance greatly.

2. When the display effect damaged value of the display screen is detected, the detection will be performed according to user's requirements, for example, the detection is performed when a device in which the display screen is located is powered on, thereby enabling the user to control the detecting opportunity.

3. With respect to the adjustment on the display effect of the display screen, the contrast can be adjusted alone, the brightness also can be adjusted alone, and the contrast and brightness can be also adjusted simultaneously, it can be fully guaranteed that the display effect after the adjustment can meet the requirements of users.

Though the preferred embodiments of the present document have been described, other changes and modifications can be made on these embodiments once those skilled in the art acquire the basic creative concepts. Therefore, the appended claims are intended to be interpreted as comprising the preferred embodiments and all the changes and modifications falling into the scope of the present document.

Apparently, those skilled in the art can make various modifications and variations for the present document without departing from the spirit and scope of the present document. Therefore, if these modifications and variations of the present document belong to the scope of the claims of the present document and equivalent techniques thereof, then the present document also intends to include these modifications and variations.

What is claimed is:

1. A method for managing a display screen, comprising:

dividing the display screen into at least two display areas;

detecting a first display effect damaged value of a first display area in the at least two display areas, said display effect damage of the first display area being caused by stains made by a user on the surface of the first display area of the display screen;

comparing the first display effect damaged value with a predetermined threshold value, and outputting a first comparison result; and when the first display effect damaged value is larger than the threshold value, adjusting a display effect of the first display area to a first display effect based on the first display effect damaged value, to match the first display effect with a second display effect of a second display area without stains on the surface;

wherein the more display areas that the display screen is divided into, the higher the accuracy is and the better the display effects are when the display effects of the display screen are adjusted for display effect damage caused by stains made by the user on the surface of the display screen;

wherein, the step of detecting a first display effect damaged value of a first display area in the at least two display areas comprises:

detecting a first capacitance value of the first display area; and based on the first capacitance value, determining the first display effect damaged value corresponding to the first capacitance value using a comparison relationship table between capacitance values and display effect damaged values;

wherein, the display effect comprises contrast, and the step of adjusting a display effect of the first display area to a first display effect based on the first display effect damaged value to match the first display effect with a second display effect of a second display area without stains on the surface comprises:

adjusting a contrast of the first display area to a first contrast using a comparison relationship table between display effect damaged values and contrasts, to match the first contrast with a second contrast of the second display area without stains.

2. The method according to claim 1, wherein, the threshold value is determined through the following steps:

collecting at least one parameter value used for determining the threshold value; and determining the threshold value based on the at least one parameter value.

3. The method according to claim 2, wherein, the step of detecting a first display effect damaged value of a first display area in the at least two display areas comprises:

when a device in which the display screen is located is powered on, detecting the first display effect damaged value of the first display area in the at least two display areas; or when a device in which the display screen is located converts from an operating state with low power consumption to an operating state with high power consumption, detecting the first display effect damaged value of the first display area in the at least two display areas; or in the process of a device in which the display screen is located being in an operating state, detecting the first display effect damaged value of the first display area in the at least two display areas at regular time periods.

4. The method according to claim 1, wherein, the display effect further comprises brightness, and the step of adjusting a display effect of the first display area to a first display effect based on the first display effect damaged value to match the first display effect with a second display effect of a second display area without stains on the surface comprises:

adjusting a brightness of the first display area to a first brightness using a comparison relationship table between display effect damaged values and brightnesses, to match the first brightness with a second brightness of the second display area without stains.

5. An apparatus for managing a display screen, wherein:

the display screen is divided into at least two display areas, and the apparatus comprises:

a processor; and a storage device storing processor executable instructions that when executed by the processor, cause the processor to perform steps in the following modules:

a detection module, configured to determine a first display effect damaged value of a first display area in the at least two display areas, said display effect damage of the first display area being caused by stains made by a user on the surface of the first display area of the display screen;

a comparison module, configured to compare the first display effect damaged value with a predetermined threshold value, and output a first comparison result; and an adjustment module, configured to, when the first display effect damaged value is larger than the threshold value, adjust a display effect of the first display area to a first display effect based on the first display effect damaged value, wherein the first display effect matches with a second display effect of a second display area without stains on the surface;

wherein the more display areas that the display screen is divided into, the higher the accuracy is and the better the display effects are when the display effects of the display screen are adjusted for display effect damage caused by stains made by the user on the surface of the display screen;

wherein, the detection module comprises:

a hardware capacitance detection module, configured to detect a first capacitance value of the first display area; and a display effect damaged value determination module, configured to, based on the first capacitance value, determine the first display effect damaged value corresponding to the first capacitance value using a comparison relationship table between capacitance values and display effect damaged values;

wherein, the display effect comprises contrast, and the adjustment module is configured to adjust the display effect of the first display area to the first display effect based on the first display effect damaged value to match the first display effect with the second display effect of the second display area without stains on the surface in the following way:

the adjustment module using a comparison relationship table between display effect damaged values and contrasts, adjusting a contrast of the first display area to a first contrast, wherein the first contrast matches with a second contrast of the second display area without stains.

6. The apparatus according to claim 5, wherein the storage device further stores instructions that when executed by the processor, cause the processor to perform steps in the following modules:

a collection module, configured to collect at least one parameter value used for determining the threshold value; and a threshold value determination module, configured to determine the threshold value based on the at least one parameter value.

7. The apparatus according to claim 6, wherein, the detection module is configured to determine the first display effect damaged value of the first display area in the at least two display areas when following conditions are met, and the conditions are:

a device in which the display screen is located being powered on; or a device in which the display screen is located converting from an operating state with low power consumption to an operating state with high power consumption; or in the process of a device in which the display screen is located being in an operating state, and an expiration of a regular time period.

8. The apparatus according to claim 5, wherein, the display effect further comprises brightness, and the adjustment module is configured to adjust the display effect of the first display area to the first display effect based on the first display effect damaged value to match the first display effect with the second display effect of the second display area without stains on the surface in the following way:

the adjustment module using a comparison relationship table between display effect damaged values and brightnesses, adjusting a brightness of the first display area to a first brightness, wherein the first brightness matches with a second brightness of the second display area without stains.

9. A display screen, comprising:

a hardware display unit, configured to display display data transmitted to the display screen, wherein the display screen is divided into at least two display areas; and a management apparatus, connected with the display unit;

wherein, the management apparatus comprises:

a processor; and a storage device storing processor executable instructions that when executed by the processor, cause the processor to perform steps in the following modules:

a detection module, configured to determine a first display effect damaged value of a first display area in the at least two display areas, said display effect damage of the first display area being caused by stains made by a user on the surface of the first display area of the display screen;

a comparison module, configured to compare the first display effect damaged value with a predetermined threshold value, and output a first comparison result; and an adjustment module, configured to, when the first display effect damaged value is larger than the threshold value, adjust a display effect of the first display area to a first display effect based on the first display effect damaged value, wherein the first display effect matches with a second display effect of a second display area without stains on the surface;

wherein the more display areas that the display screen is divided into, the higher the accuracy is and the better the display effects are when the display effects of the display screen are adjusted for display effect damage caused by stains made by the user on the surface of the display screen;

wherein, the detection module comprises:

a hardware capacitance detection module, configured to detect a first capacitance value of the first display area; and a display effect damaged value determination module, configured to, based on the first capacitance value, determine the first display effect damaged value corresponding to the first capacitance value using a comparison relationship table between capacitance values and display effect damaged values;

wherein, the display effect comprises contrast, and the adjustment module is configured to adjust the display effect of the first display area to the first display effect based on the first display effect damaged value to match the first display effect with the second display effect of the second display area without stains on the surface in the following way:

the adjustment module using a comparison relationship table between display effect damaged values and contrasts, adjusting a contrast of the first display area to a first contrast, wherein the first contrast matches with a second contrast of the second display area without stains.

* * * * *